US011693702B2

(12) United States Patent
Rosanova et al.

(10) Patent No.: US 11,693,702 B2
(45) Date of Patent: Jul. 4, 2023

(54) SYSTEMS AND METHODS FOR MANAGING USAGE OF COMPUTING RESOURCES

(71) Applicant: The Toronto-Dominion Bank, Toronto (CA)

(72) Inventors: Vincent Rosanova, Whitby (CA); Wendy Elizabeth Murphy, Toronto (CA)

(73) Assignee: The Toronto-Dominion Bank, Toronto (CA)

( * ) Notice: Subject to any disclaimer, the term of this patent is extended or adjusted under 35 U.S.C. 154(b) by 448 days.

(21) Appl. No.: 16/837,167

(22) Filed: Apr. 1, 2020

(65) Prior Publication Data
US 2021/0311791 A1    Oct. 7, 2021

(51) Int. Cl.
*G06F 9/50* (2006.01)
*G06F 16/2458* (2019.01)
(Continued)

(52) U.S. Cl.
CPC .......... *G06F 9/5027* (2013.01); *G06F 9/4881* (2013.01); *G06F 16/2458* (2019.01); *G06F 16/288* (2019.01)

(58) Field of Classification Search
None
See application file for complete search history.

(56) References Cited

U.S. PATENT DOCUMENTS 7,814,492 B1 * 10/2010 Creemer ............... G06F 9/5061
718/100
8,400,467 B1 * 3/2013 Ponce De Leon ..........................
G06Q 10/0631
345/619
(Continued)

FOREIGN PATENT DOCUMENTS

| CN | 107943522 A | 4/2018 |
|---|---|---|
| CN | 109377195 A | 2/2019 |
| CN | 109978392 A | 7/2019 |

OTHER PUBLICATIONS

Daniel Galin; "Project Progress Control" Software Quality: Concepts and Practice; IEEE 2018; (Galin_2018.pdf; pp. 617-632) (Year: 2018).*

(Continued)

*Primary Examiner* — Hiren P Patel
(74) *Attorney, Agent, or Firm* — Rowand LLP

(57) ABSTRACT

A processor-implemented method is disclosed. The method includes: obtaining, from an activity logging system, activity data associated with one or more defined computing tasks, the activity data indicating progress towards completion of the one or more defined computing tasks, the defined computing tasks being associated with one or more projects; obtaining, from a resource usage monitoring system, time-based resource tracking data associated with at least one of the projects, the resource tracking data including project identifying data associated with the at least one project and project time data identifying one or more time periods reflecting use of a computing resource in association with the at least one project; determining mappings of the one or more time periods to the one or more defined computing tasks based on the project identifying data and the activity data associated with the one or more defined computing tasks; determining, based on the mappings, that at least one task-based resource usage criterion is satisfied; and in response to determining that the at least one task-based resource usage criterion is satisfied, generating a notification of resource usage for display on a computing device.

18 Claims, 6 Drawing Sheets

(51) Int. Cl.
  *G06F 16/28* (2019.01)
  *G06F 9/48* (2006.01)

(56) References Cited

U.S. PATENT DOCUMENTS

| | | | | |
|---|---|---|---|---|
| 9,367,355 | B1* | 6/2016 | Schillings | G06F 9/5027 |
| 9,501,751 | B1 | 11/2016 | Holler et al. | |
| 9,619,208 | B2* | 4/2017 | Davidov | G06F 8/10 |
| 9,818,076 | B2* | 11/2017 | Aparimit | G06Q 10/06313 |
| 10,061,578 | B2 | 8/2018 | Walsh et al. | |
| 10,248,387 | B2 | 4/2019 | Bharthulwar | |
| 10,469,565 | B2* | 11/2019 | Birkestrand | G06F 9/5061 |
| 10,503,499 | B2 | 12/2019 | Bishop | |
| 10,540,573 | B1 | 1/2020 | Li et al. | |
| 10,778,664 | B1* | 9/2020 | Sullivan | H04L 63/08 |
| 11,023,279 | B2* | 6/2021 | Crotty | G06F 8/20 |
| 2003/0018952 | A1* | 1/2003 | Roetzheim | G06F 11/3616 714/E11.22 |
| 2004/0054566 | A1* | 3/2004 | J'Maev | G06Q 10/10 705/7.23 |
| 2006/0101383 | A1* | 5/2006 | Raffo | G06F 8/20 717/104 |
| 2006/0168584 | A1* | 7/2006 | Dawson | G06F 11/3495 714/E11.202 |
| 2007/0150327 | A1* | 6/2007 | Dromgold | G06F 16/2477 705/7.17 |
| 2008/0195449 | A1* | 8/2008 | Snapkauskas | G06Q 10/0639 705/7.38 |
| 2009/0048896 | A1* | 2/2009 | Anandan | G06Q 10/06 705/7.26 |
| 2009/0254399 | A1* | 10/2009 | Cristol | G06Q 30/02 705/7.36 |
| 2011/0276354 | A1* | 11/2011 | Bijani | G06F 8/20 705/7.11 |
| 2013/0246110 | A1* | 9/2013 | Nakhayi Ashtiani | G06Q 30/0207 705/7.13 |
| 2015/0207752 | A1* | 7/2015 | Birkestrand | H04L 67/1008 709/226 |
| 2015/0347944 | A1* | 12/2015 | Aparimit | G06Q 10/06313 705/7.23 |
| 2016/0306670 | A1* | 10/2016 | Arndt | G06F 11/3409 |
| 2016/0307133 | A1* | 10/2016 | Kour | G06Q 10/06313 |
| 2017/0053244 | A1 | 2/2017 | Khalil | |
| 2018/0176148 | A1* | 6/2018 | Ku | H04L 47/823 |
| 2018/0275988 | A1 | 9/2018 | Shmaya et al. | |
| 2018/0321972 | A1* | 11/2018 | Lin | G06F 1/329 |
| 2019/0050811 | A1* | 2/2019 | Kang | G06Q 10/1097 |
| 2019/0155577 | A1* | 5/2019 | Prabha | G06Q 10/0635 |
| 2019/0347095 | A1* | 11/2019 | Adams | G06F 8/77 |
| 2020/0026561 | A1* | 1/2020 | Slinger | G06F 9/4881 |

OTHER PUBLICATIONS

Sadiq et al.; "Software Project Management: Tools assessment, comparison and suggestion for future development"; IJCSNS Feb. 19, 2016; (Sadiq_2016.pdf; pp. 1-13) (Year: 2016).*

Bishop: "Metagility: Managing Agility for Competitive Advantage in New Product Development", 2017 IEEE Technology & Engineering Management Conference (TEMSCON), published on Jun. 8, 2017.

Alyahya: "A Computer-Based Holistic Approach to Managing Progress of Distributed Agile Teams", Cardiff University (United Kingdom), ProQuest Dissertations, retrieved from: http://orca.cf.ac.uk/47510/1/2013AlyahyaSPhD.pdf, published on May 2013.

* cited by examiner

SYSTEMS AND METHODS FOR MANAGING USAGE OF COMPUTING RESOURCES

TECHNICAL FIELD

The present disclosure relates to computing resource management and, more particularly, to managing allocation of computing resources in software development processes.

BACKGROUND

Software development projects generally involve numerous requirements, features, tasks, and resources or assets. Various different software development paradigms, such as agile development, incremental build models, and waterfall development, may be employed independently or in combination for facilitating management of software development processes. The values and principles of these paradigms underpin a broad range of software development frameworks. By way of example, agile development is a software development paradigm that advocates iterative, incremental and adaptive development. Agile process frameworks, such as Scrum, Kanban, Lean Development, AgileUP, and Dynamic Systems Development Method (DSDM), are used in practice for supporting project management.

Effective adoption of software development methodologies may be supported through the use of project management tools. A key aspect of project management is the collection and analysis of metrics associated with the development process. Tracking of metrics in connection with project status, features progress, and resource costs is useful for managing the limited computing resources that are used in a software development project. For example, project management tools may be used for identifying inefficiencies in computing resource usage for a particular project, and for determining efficient re-allocation of the computing resources. Such tools rely on resource usage data (e.g. usage of computing devices associated with software developers, shared software assets, etc.) for assessing the performance or production of a project.

It would be desirable to provide systems and methods which enable efficient computing resource allocation for software development projects, combining project progress monitoring with resource usage evaluation and control. Effective tracking of project metrics relating to computing resource usage can improve resource utilization.

BRIEF DESCRIPTION OF THE DRAWINGS

Reference will now be made, by way of example, to the accompanying drawings which show example embodiments of the present application and in which.

Like reference numerals are used in the drawings to denote like elements and features.

DETAILED DESCRIPTION OF EXAMPLE EMBODIMENTS

Figure 1:
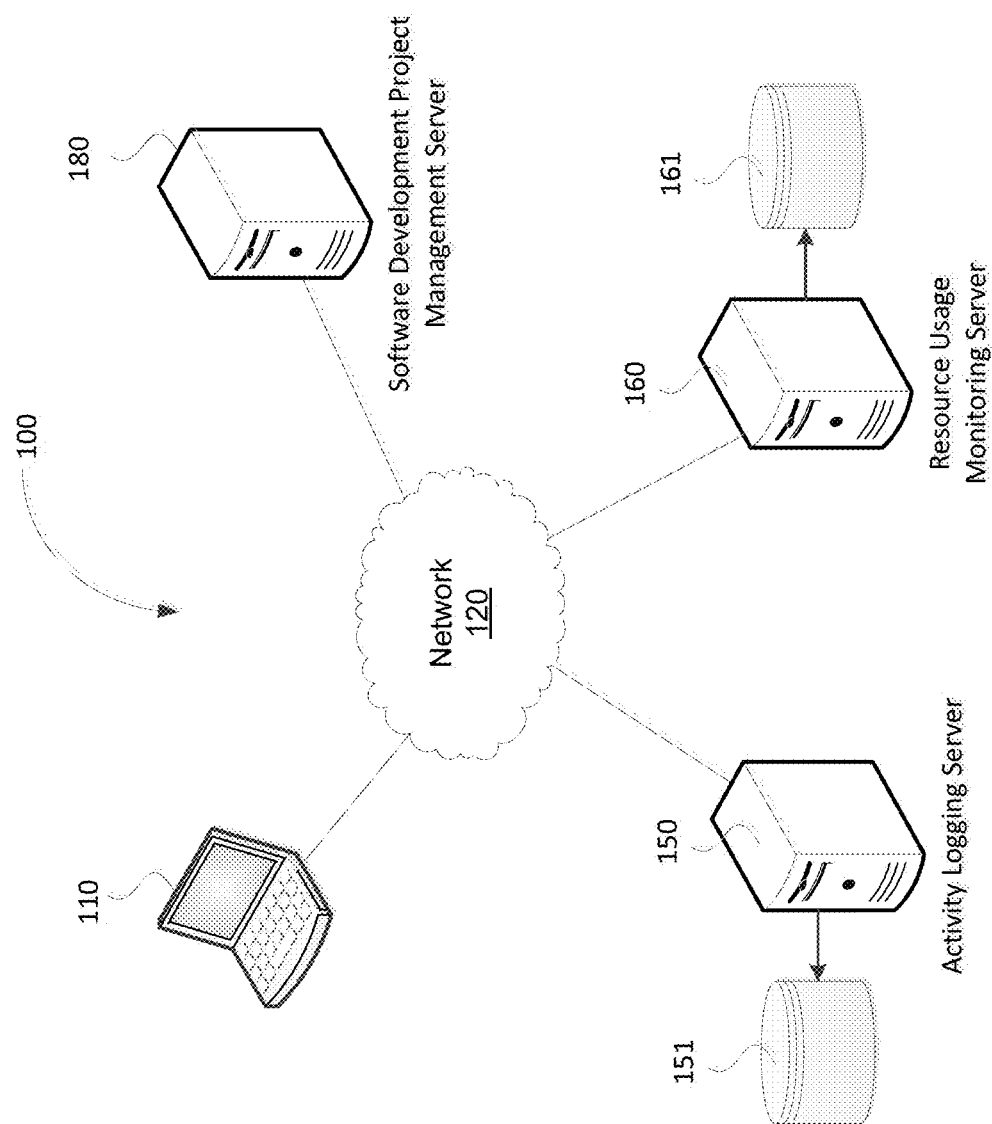
FIG. 1 is a schematic operation diagram illustrating an operating environment of an example embodiment.

In an aspect, a computing system is disclosed. The computing system includes a communications module communicable with an external network, a memory, and a processor coupled to the communications module and the memory. The processor is configured to: obtain, from an activity logging system, activity data associated with one or more defined computing tasks, the activity data indicating progress towards completion of the one or more defined computing tasks, the defined computing tasks being associated with one or more projects; obtain, from a resource usage monitoring system, time-based resource tracking data associated with at least one of the projects, the resource tracking data including project identifying data associated with the at least one project and project time data identifying one or more time periods reflecting use of a computing resource in association with the at least one project; determine mappings of the one or more time periods to the one or more defined computing tasks based on the project identifying data and the activity data associated with the one or more defined computing tasks; determine, based on the mappings, that at least one task-based resource usage criterion is satisfied; and in response to determining that the at least one task-based resource usage criterion is satisfied, generate a notification of resource usage for display on a computing device.

In some implementations, the notification of resource usage may be an indication of a total amount of time associated with completing the one or more defined tasks.

In some implementations, the notification of resource usage may be an indication of a total cost associated with completing the one or more defined tasks.

In some implementations, determining that the at least one task-based resource usage criterion is satisfied may comprise determining that a total cost associated with resource usage for the one or more defined computing tasks has exceeded a predefined threshold.

In some implementations, determining that the at least one task-based resource usage criterion is satisfied may comprise determining that a total amount of time associated with resource usage for the one or more defined computing tasks has exceeded a predefined threshold.

In some implementations, the project time data may include date information associated with the at least one project, and the mappings may be determined based on determining dates associated with the one or more defined computing tasks from the date information.

In some implementations, the project identifying data may comprise a project number, In some implementations, the time-based resource tracking data may comprise a listing of time entries, each of the time entries being associated with a project number and a date.

In some implementations, the processor may be further configured to: obtain resource usage information for a plurality of defined tasks that are associated with an entity;

and generate a notification for the entity based on the resource usage information for the plurality of defined tasks associated with the entity.

In some implementations, the notification may be a predefined message that is selected based on the resource usage information for the entity.

In another aspect, a method for managing computing resources associated with a software development project is disclosed. The method includes: obtaining, from an activity logging system, activity data associated with one or more defined computing tasks, the activity data indicating progress towards completion of the one or more defined computing tasks, the defined computing tasks being associated with one or more projects; obtaining, from a resource usage monitoring system, time-based resource tracking data associated with at least one of the projects, the resource tracking data including project identifying data associated with the at least one project and project time data identifying one or more time periods reflecting use of a computing resource in association with the at least one project; determining mappings of the one or more time periods to the one or more defined computing tasks based on the project identifying data and the activity data associated with the one or more defined computing tasks; determining, based on the mappings, that at least one task-based resource usage criterion is satisfied; and in response to determining that the at least one task-based resource usage criterion is satisfied, generating a notification of resource usage for display on a computing device.

In yet another aspect, a non-transitory computer readable storage medium is disclosed. The computer readable storage medium contains instructions thereon which, when executed by a processor, configure the processor to: obtain, from an activity logging system, activity data associated with one or more defined computing tasks, the activity data indicating progress towards completion of the one or more defined computing tasks, the defined computing tasks being associated with one or more projects; obtain, from a resource usage monitoring system, time-based resource tracking data associated with at least one of the projects, the resource tracking data including project identifying data associated with the at least one project and project time data identifying one or more time periods reflecting use of a computing resource in association with the at least one project; determine mappings of the one or more time periods to the one or more defined computing tasks based on the project identifying data and the activity data associated with the one or more defined computing tasks; determine, based on the mappings, that at least one task-based resource usage criterion is satisfied; and in response to determining that the at least one task-based resource usage criterion is satisfied, generate a notification of resource usage for display on a computing device.

Other example embodiments of the present disclosure will be apparent to those of ordinary skill in the art from a review of the following detailed descriptions in conjunction with the drawings.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

The present application discloses a system for managing software development projects. The system obtains activity (or task) data associated with one or more computing tasks for various projects. The activity data may indicate, for each of the computing tasks, an amount of work required to complete the task, task progress status, development period(s), and an identity of an associated project. The system also obtains time-based resource tracking data associated with the projects. The time-based resource tracking data provides, at least, time-tracking data for the projects, identifying time periods of computing resource usage in connection with the projects. Based on the activity data and the time-based resource tracking data, the system generates mappings of time periods to the defined computing tasks. These mappings, in turn, form the basis of assessing various metrics associated with managing of one or more software development projects. For example, the system may generate notifications of an amount of time spent towards completion of defined computing tasks or a total cost of completion of the computing tasks.

The present application discloses a system for allocating limited computing resources for software development projects. A request for allocating computing resources may be received by the system, for example, from a client computing device (e.g. a device associated with a Scrum master). The system may determine mappings of time periods to defined computing tasks that are associated with a particular development project. Based on these mappings, the system may determine an overall cost (and/or one or more different metrics) associated with the software development project. The system may compare the values of the metrics (e.g. overall cost) to predefined threshold values, in order to assess the optimality of a current allocation of computing resources to the development project. If the metric values satisfy certain criteria with respect to the predefined threshold values, the system may determine that the computing resources should be re-allocated. For example, if an overall cost of the project is determined to be greater than a threshold value, the system may generate a notification indicating a re-allocation of the computing resources currently associated with (or committed) to the development project. Additionally, or alternatively, the system may control access to computing resources, such as shared software assets, associated with the project based on the comparison of the metric values to thresholds.

FIG. 1 is a schematic diagram of an exemplary operating environment in accordance with embodiments of the present disclosure. FIG. 1 illustrates exemplary components of a system 100, including one or more client devices 110, an activity logging server 150, a resource usage monitoring server 160, and a software development project management (SDPM) server 180. The components of system 100 may be configured to provide, in conjunction, various functionalities relating to computing resources management. More particularly, the system 100 allows for tracking various metrics associated with one or more software development projects, and managing limited computing resources that are employed to support the projects.

As illustrated, the activity logging server 150, the resource usage monitoring server 160, the SDPM server 180, and client device 110 communicate via the network 120. The client device 110 is a computing device that may be associated with a developer entity. For example, the client device 110 may be a computing device that is used by a developer for working on one or more software development projects being managed by the SDPM server 180. In particular, the client device 110 may be associated with a developer that is part of a software development project team. The client device 110 may take a variety of forms including, for example, a mobile communication device such as a smartphone, a tablet computer, a wearable computer (e.g. head-mounted display, smartwatch, etc.), a laptop or desktop computer, or a computing device of another type.

The activity logging server 150 provides activity (or task) data in connection with various computing tasks associated with one or more software development projects. In at least some embodiments, the activity logging server 150 may administer an activity tracking application that allows for, among others, collection and storage of data relating to tasks associated with various software development projects. The activity tracking application may provide functionalities such as, for example, tasks and sub-tasks tracking, bugs and defect management, project data analysis and insights reporting, and workflow customization. In particular, the activity tracking application may collect and store tasks data from client devices that are associated with one or more specific projects. For example, the activity tracking application may be accessible via client computing devices, either as a software package that is installed on a client computing device or as a cloud-based application. The activity logging server 150 may be a backend server for the activity tracking application.

As shown in FIG. 1, the activity logging server 150 is coupled to a tasks database 151. The tasks database 151 may be provided internally within the activity logging server 150 or externally. The tasks database 151 stores tasks data collected via one or more client computing devices. Tasks data includes information relating to tasks that are associated with one or more software development projects. In some embodiments, for each task associated with a project, the tasks data may indicate task identity, progress status, amount of work required to complete the task, development period(s), any sub-tasks data, and assigned developer data.

The resource usage monitoring server 160 provides time-based resource tracking data associated with one or more software development projects. The resource tracking data for a project includes, at least, project identifying data and project time data identifying one or more time periods reflecting use of a computing resource in association with the project. The resource usage monitoring server 160 may be a backend server for a time-tracking application which allows for controlling and tracking the time spent on one or more projects. The time-tracking application may be a software package that is installed on a client computing device or a cloud-based application. The time-tracking application may support, for each of the one or more projects, time logging, time-based data analysis, and insights reporting. The time-based resource tracking data may be stored in a database 161 (shown in FIG. 1) that is coupled to the resource usage monitoring server 160.

The SDPM server 180 is configured to provide functionalities relating to project management for one or more software development projects. The SDPM server 180 may serve as a centralized tool for aggregating projects-related data, controlling assignment (or allocation) of computing resources to tasks, project planning, requirements and change management, and controlling software release schedules. In accordance with embodiments of the present disclosure, the SDPM server 180 may obtain data from one or both of the activity logging server 150 and the resource usage monitoring server 160 to determine costs associated with tasks of a software development project, identify inefficiencies in a current allocation of computing resources, and determine a more efficient re-allocation of the computing resources.

As illustrated in FIG. 1, the SDPM server 180 may be connected to the client device 110, activity logging server 150, and the resource usage monitoring server 160 via the network 120. The client device 110, the activity logging server 150, the resource usage monitoring server 160, and the SDPM server 180 may be in geographically disparate locations. Put differently, the client device 110 may be remote from at least one of the activity logging server 150, the resource usage monitoring server 160, and the SDPM server 180.

The client device 110, the activity logging server 150, the resource usage monitoring server 160, and the SDPM server 180 are computer systems. The network 120 is a computer network. In some embodiments, the network 120 may be an internetwork such as may be formed of one or more interconnected computer networks. For example, the network 120 may be or may include an Ethernet network, an asynchronous transfer mode (ATM) network, a wireless network, or the like.

Figure 2:
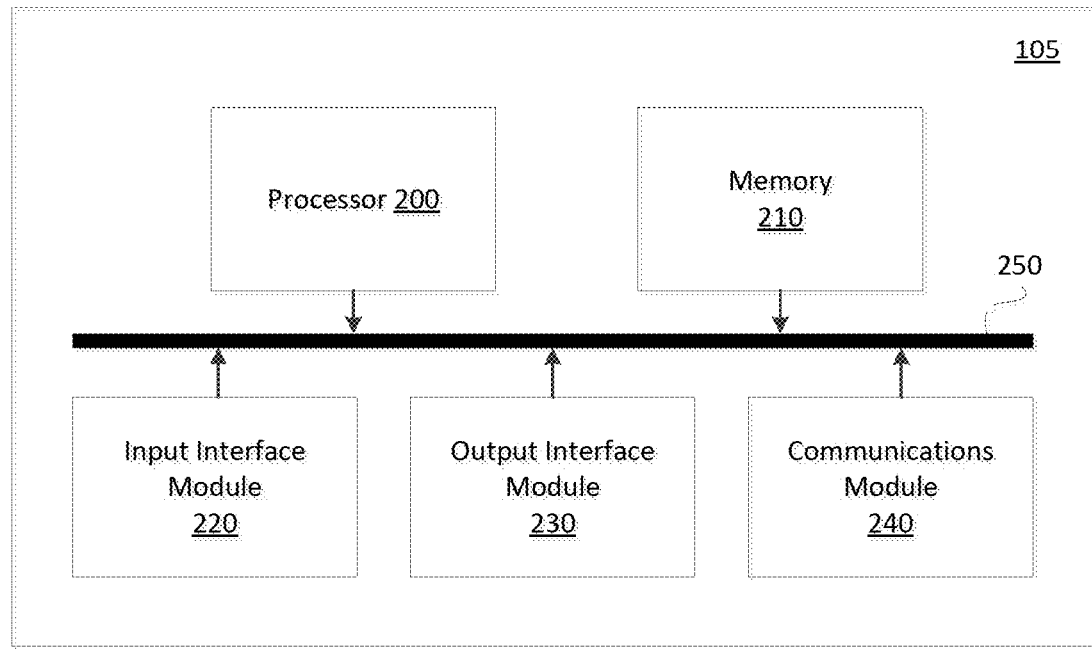
FIG. 2 is a high-level schematic diagram of an example computing device.

FIG. 2 is a high-level operation diagram of an example computing device 105. In some embodiments, the example computing device 105 may be exemplary of one or more of the client devices 110, the activity logging server 150, the resource usage monitoring server 160, and the SDPM server 180. The example computing device 105 includes a variety of modules. For example, as illustrated, the example computing device 105, may include a processor 200, a memory 210, an input interface module 220, an output interface module 230, and a communications module 240. As illustrated, the foregoing example modules of the example computing device 105 are in communication over a bus 250.

The processor 200 is a hardware processor. The processor 200 may, for example, be one or more ARM, Intel x86, PowerPC processors or the like.

The memory 210 allows data to be stored and retrieved. The memory 210 may include, for example, random access memory, read-only memory, and persistent storage. Persistent storage may be, for example, flash memory, a solid-state drive or the like. Read-only memory and persistent storage are a computer-readable medium. A computer-readable medium may be organized using a file system such as may be administered by an operating system governing overall operation of the example computing device 105.

The input interface module 220 allows the example computing device 105 to receive input signals. Input signals may, for example, correspond to input received from a user. The input interface module 220 may serve to interconnect the example computing device 105 with one or more input devices. Input signals may be received from input devices by the input interface module 220. Input devices may, for example, include one or more of a touchscreen input, keyboard, trackball or the like. In some embodiments, all or a portion of the input interface module 220 may be integrated with an input device. For example, the input interface module 220 may be integrated with one of the aforementioned exemplary input devices.

The output interface module 230 allows the example computing device 105 to provide output signals. Some output signals may, for example allow provision of output to a user. The output interface module 230 may serve to interconnect the example computing device 105 with one or more output devices. Output signals may be sent to output devices by an output interface module 230. Output devices may include, for example, a display screen such as, for example, a liquid crystal display (LCD), a touchscreen display. Additionally, or alternatively, output devices may include devices other than screens such as, for example, a speaker, indicator lamps (such as for, example, light-emitting diodes (LEDs)), and printers. In some embodiments, all or a portion of the output interface module 230 may be integrated with an output device. For example, the output interface module 230 may be integrated with one of the aforementioned example output devices.

The communications module 240 allows the example computing device 105 to communicate with other electronic devices and/or various communications networks. For example, the communications module 240 may allow the example computing device 105 to send or receive communications signals. Communications signals may be sent or received according to one or more protocols or according to one or more standards. For example, the communications module 240 may allow the example computing device 105 to communicate via a cellular data network, such as for example, according to one or more standards such as, for example, Global System for Mobile Communications (GSM), Code Division Multiple Access (CDMA), Evolution Data Optimized (EVDO), Long-term Evolution (LTE) or the like. The communications module 240 may allow the example computing device 105 to communicate using near-field communication (NFC), via Wi-Fi™, using Bluetooth™ or via some combination of one or more networks or protocols. In some embodiments, all or a portion of the communications module 240 may be integrated into a component of the example computing device 105. For example, the communications module may be integrated into a communications chipset.

Software comprising instructions is executed by the processor 200 from a non-transitory computer-readable medium. For example, software may be loaded into random-access memory from persistent storage of memory 210. Additionally, or alternatively, instructions may be executed by the processor 200 directly from read-only memory of memory 210.

Figure 3:
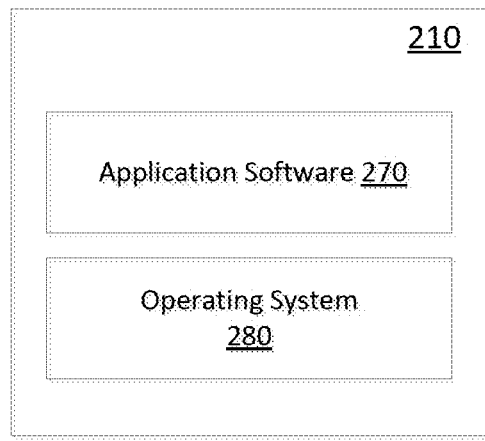
FIG. 3 is a schematic block diagram showing a simplified organization of software components stored in memory of the example computing device of FIG. 2.

FIG. 3 is a schematic block diagram showing a simplified organization of software components stored in memory 210 of the example computing device 105. As illustrated these software components include an operating system 280 and an application 270.

The operating system 280 is software. The operating system 280 allows the application 270 to access the processor 200, the memory 210, the input interface module 220, the output interface module 230 and the communications module 240. The operating system 280 may be, for example, Apple's iOS™, Google's Android™, Linux™, Microsoft's Windows™, or the like.

The application 270 adapts the example computing device 105, in combination with the operating system 280, to operate as a device performing particular functions. For example, the application 270 may cooperate with the operating system 280 to adapt a suitable embodiment of the example computing device 105 to operate as the client device 110, the activity logging server 150, the resource usage monitoring server 160, and the SDPM server 180.

While a single application 270 is illustrated in FIG. 3, in operation, the memory 210 may include more than one application 270, and different applications 270 may perform different operations. For example, in embodiments where the computing device 105 is functioning as a client device 110, the application 270 may comprise a value transfer application which may, for example, be a personal banking application. The value transfer application may be configured for secure communications with the resource server 140 and may provide various banking functions such as, for example, display of account balances, transfers of value (e.g. bill payments, money transfers), and other account management functions.

Figure 4:
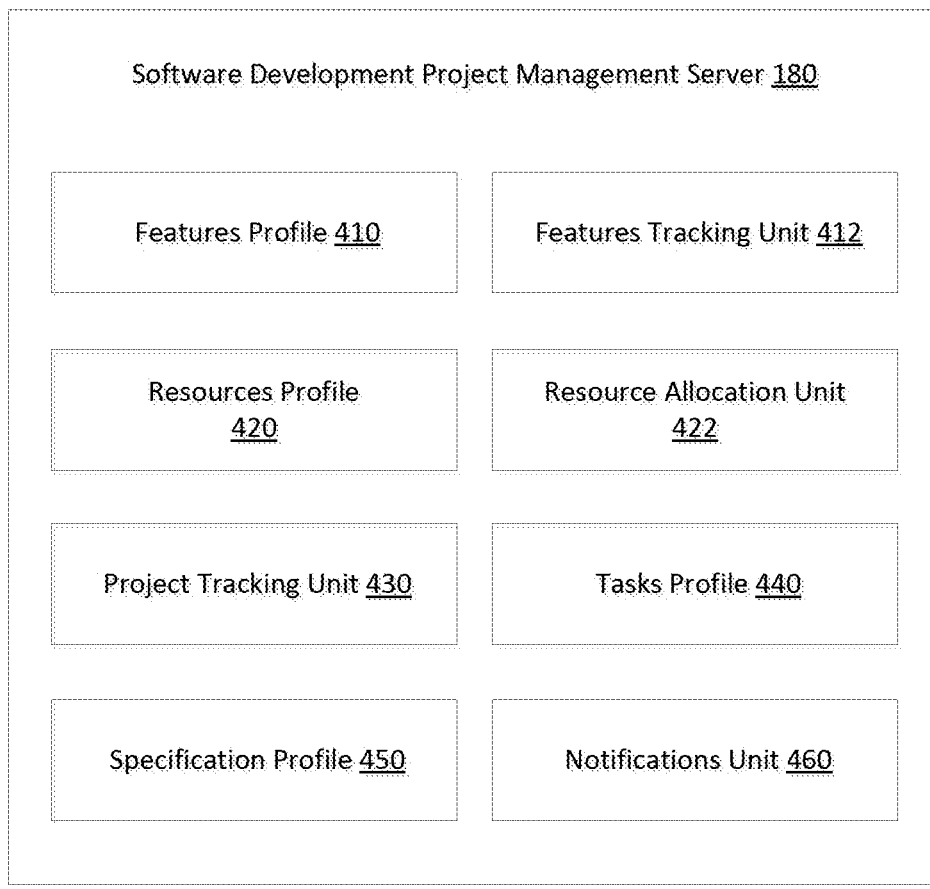
FIG. 4 is a schematic block diagram showing software components which may be implemented an example software development project management system.

FIG. 4 is a schematic block diagram showing software components which may be implemented in the SDPM system 180 of FIG. 1. The SDPM system 180 is configured to manage one or more software development projects. The software components include, at least, a features profile 410, a features tracking unit 412, a resource profile 420, a resource allocation unit 422, a project tracking unit 430, a tasks profile 440, a specification profile 450, and a notifications unit 460.

The features profile 410 stores information relating to features associated with the software development projects. For example, the features profile 410 may store data relating to features that are planned for, undergoing development, or implemented in one or more of the software development projects. A "feature" of a software generally refers to a unit of functionality within the software. The features profile 410 may indicate, for each of one or more features, a progress status, a priority of the feature, one or more tasks associated with the feature, and an amount of work required to implement the feature. The features tracking unit 412 may facilitate collection, analysis, and reporting of data associated with the features included in the features profile 410.

The resources profile 420 includes information relating to resources that are employed in the development of the software applications. A project "resource" is a resource that has been assigned to a project, and may refer to, for example, a computing resource, a shared software asset, or a software developer. The resources profile 420 may indicate, for each resource, identity of the resource, type of the resource, associated project(s), a total work capacity, an available work capacity, availability periods, and usage status. The resource allocation unit 422 is configured to determine allocations of resources, including computing resources, to one or more software development projects. In particular, the resource allocation unit 422 may determine assignments of available resources to tasks that are associated with the software development projects.

The project tracking unit 430 is configured to track and report information relating to the software development projects. For example, the project tracking unit may monitor, among others, progress status, expected completion time, release schedules, bugs and issues, and requirements changes.

The tasks profile 440 stores data relating to the tasks that are associated with features of the software being developed. For example, the tasks profile 440 may indicate, for each of one or more of the tasks, associated project(s), an amount of work required to complete the task, a progress status, and development period(s). The specification profile 450 includes descriptions of software applications that are to be developed or currently being developed. The specification profile 450 sets forth, for each software application, functional and non-functional requirements, and describes sufficient and necessary requirements for the project development.

The notifications unit 460 is configured to generate notifications in connection with the software development projects. The notifications may be sent to one or more client computing devices, for example, that are associated with project team members, such as a Scrum master, software developers, etc. with instructions for displaying on those devices. The notifications unit 460 may generate notifications based on information provided by other components of the SDPM system 180, such as the resource allocation unit 422 and project tracking unit 430.

Figure 5:
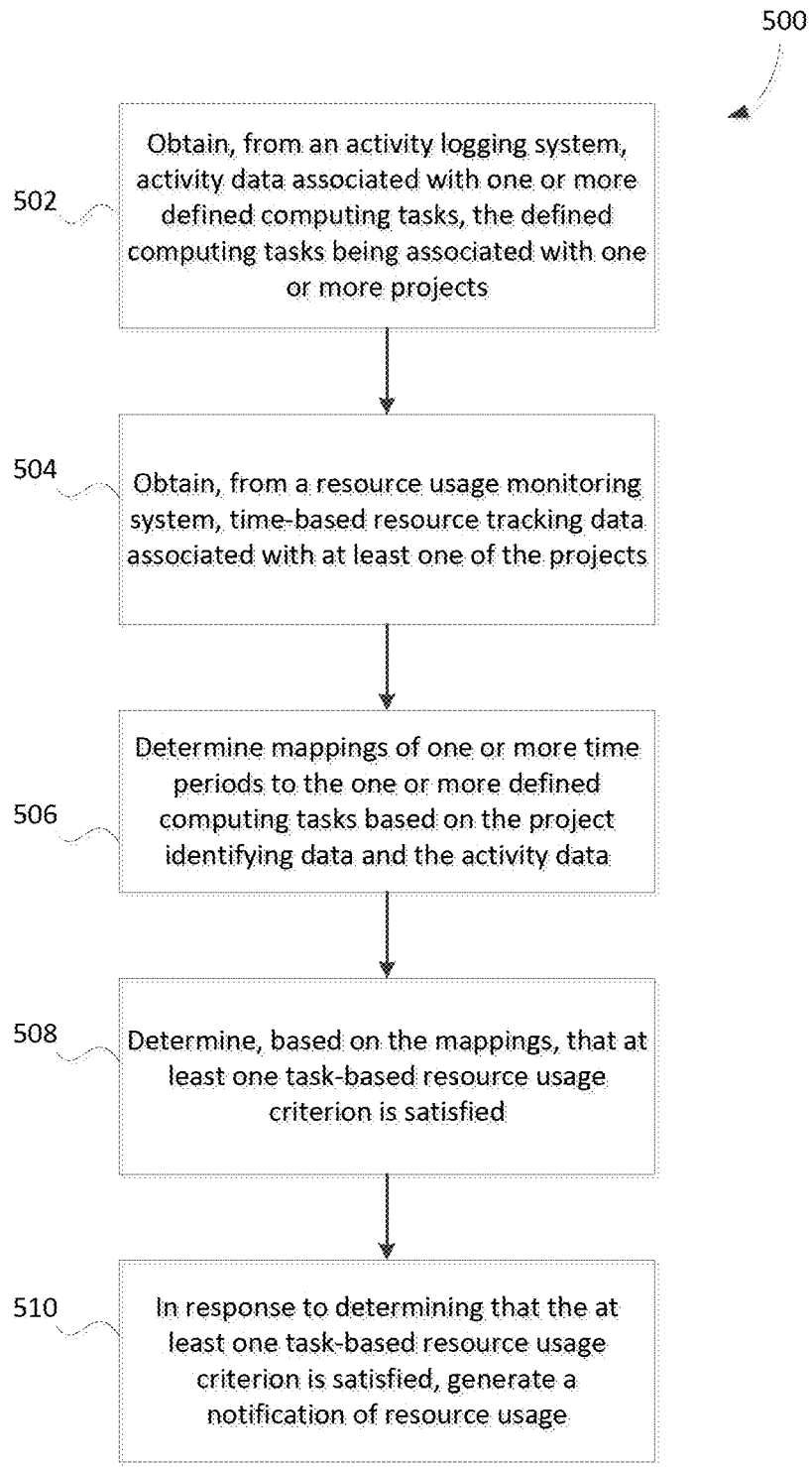
FIG. 5 shows, in flowchart form, an example method for managing computing resources associated with a software development project.

The present disclosure provides systems and methods that overcome the above-described limitations in existing solutions for software development project management. Reference is made to FIG. 5, which shows, in flowchart form, an example method 500 for managing computing resources associated with a software development project. The operations of method 500 may be performed as part of the functionalities of a software development project management system, such as the SDPM server 180 of FIG. 1. The method 500 may be incorporated into a mechanism for collecting, analyzing, and reporting various project-related metrics for one or more software development projects.

Operations 502 and onward may be performed by one or more processors of a computing device such as, for example, the processor 200 (FIG. 2) of one or more suitably configured instances of the example computing device 105 (FIG. 2). In at least some embodiments, the method 500 may be performed by a server system. In particular, a server (such as the SDPM server 180, in some embodiments) which provides project management capabilities for one or more software development projects, may perform all of part of the operations of method 500. As will be described below, the server may perform the operations of method 500 in conjunction with, at least, an activity logging system and a resource usage monitoring system.

In operation 502, the server obtains, from an activity logging system, activity data associated with one or more defined computing tasks. The activity logging system may include a server, such as the activity logging server 150 of FIG. 1, which is configured to collect and store activity (or task) data for a plurality of computing tasks that are associated with one or more different projects. For example, the activity data may include information obtained by the activity logging system from client computing devices that are employed in the projects. The activity data obtained by the server in operation 502 may, in some embodiments, include listings of defined computing tasks associated with one or more of the projects. The activity data indicates progress towards completion of the one or more defined computing tasks. For example, the activity data may include, for each defined computing task, a progress status indicator, such as a percentage value. The server may query the activity logging system for the activity data associated with specific projects, or it may receive the activity data on a periodic basis from the activity logging system.

In operation 504, the server obtains, from a resource usage monitoring system, time-based resource tracking data associated with at least one of the projects. The resource tracking data includes identifying data associated with the at least one project, such as a project number or name. The resource tracking data additionally includes logged time data associated with the projects. More specifically, the resource tracking data includes project time data identifying one or more time periods reflecting use of a computing resource in association with the at least one project. In at least some embodiments, the project time data may include data information associated with the at least one project. The date information may specify dates on which the computing resource was assigned and/or used for development tasks on the at least one project. The resource tracking data may, for example, include a listing of time entries. Each time entry may be associated with a specific project (e.g. via a project identifier, such as a project number) and a date. The server may query the resource usage monitoring system for the resource tracking data associated with specific projects, or it may receive the resource tracking data on a periodic basis from the resource usage monitoring system.

In operation 506, the server determines mappings of the one or more time periods represented by the resource tracking data to the one or more defined computing tasks. That is, the server determines the time periods during which the computing resource was used in association with the one or more defined computing tasks. The mappings are determined based on the project identifying data, such as a project number, and the activity data associated with the one or more defined computing tasks. For example, the server may determine the task that is represented by each time entry in the resource tracking data, based on a project number and date information. The server may, for example, determine that a particular task for a specific project was being worked on using the computing resource during a range of dates. The amount of time spent on that task using the computing resource may then be computed based on the resource tracking data for that project on those dates.

In operation 508, the server determines, based on the mappings, that at least one task-based resource usage criterion is satisfied. In some embodiments, a total cost associated with usage of the computing resource may be considered when assessing for a resource usage criterion. Specifically, the server may determine that a resource usage criterion is satisfied if the total cost associated with usage of the computing resource for one or more of the defined computing tasks exceeds a predefined threshold value. A "cost" associated with resource usage may be expressed in terms of monetary value of the resource use (e.g. expenses associated with the use, opportunity cost, etc.). The cost of the resource usage may be compared to a monetary threshold. In some embodiments, a total amount of time associated with the resource may be considered when assessing for a resource usage criterion. In particular, the server may determine that a resource usage criterion is satisfied if the total amount of time associated with the resource usage for one or more of the defined computing tasks exceeds a predefined threshold value (e.g. in hours).

In response to determining that the at least one task-based resource usage criterion is satisfied, the server generates a notification of resource usage in operation 510. The notification is for display on one or more computing devices, such as a device that is associated with a project team member (e.g. Scrum master, software developer, etc.). The notification serves to identify, for one or more interested parties, resource usage data and status. For example, in some embodiments, the notification of resource usage may be an indication of a total amount of time spent completing the one or more defined tasks. Additionally, or alternatively, the notification of resource usage may indicate a total cost associated with completing the one or more defined tasks using the computing resource.

In some embodiments, the server may provide notifications relating to usage data for a computing resource by a specific entity. Specifically, the server may obtain resource usage information for a plurality of defined computing tasks that are associated with a particular entity. For example, the resource usage information for all or a subset of tasks that are assigned to a particular developer may be obtained by the server. The server may then generate notifications for the entity based on the resource usage information for the defined computing tasks associated with the entity. In some embodiments, the notification may include a predefined message that is selected based on the resource usage information for the entity. For example, if the resource usage by the entity for one or more particular tasks exceeds predefined thresholds for assessing usage criterion, the server may send a message to a client computing device associated with the entity to notify the entity that the threshold was exceeded.

Figure 6:
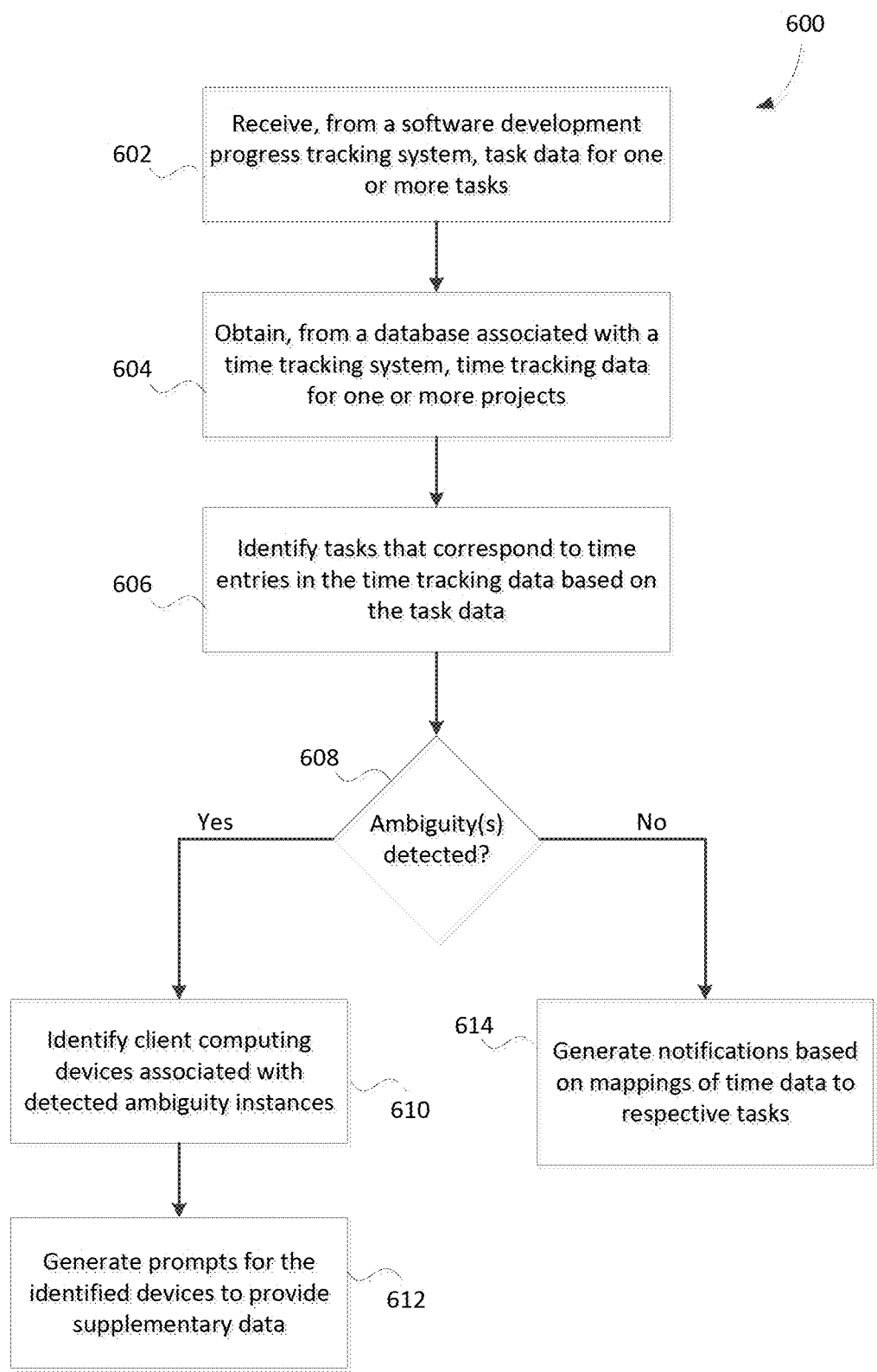
FIG. 6 shows, in flowchart form, another example method for managing computing resources associated with a software development project.

Reference is made to FIG. 6, which shows, in flowchart form, another example method 600 for managing computing resources associated with a software development project. The operations of method 600 may be performed as part of the functionalities of a software development project management system. The method 600 may be incorporated into a mechanism for collecting, analyzing, and reporting various project-related metrics for one or more software development projects.

Operations 602 and onward may be performed by one or more processors of a computing device such as, for example, the processor 200 (FIG. 2) of one or more suitably configured instances of the example computing device 105 (FIG. 2). In at least some embodiments, the method 600 may be performed by a server system, such as the SDPM server 180 of FIG. 1. The operations of method 600 may be performed in addition to, or as alternatives, to one or more of the operations of method 500 described above.

In operation 602, the server receives, from a project tracking system, task data for one or more defined computing tasks. The project tracking system may, for example, be an activity logging system, such as the activity logging server 150 of FIG. 1. The task data may include, at least, task progress information indicating progress towards completion of a defined task (or user story) identifying information for the computing resource that is used for the defined task.

In operation 604, the server obtains, from a database associated with a resource usage tracking system, time tracking data for one or more software development projects. The resource usage tracking system may, for example, include a server, such as the resource usage monitoring server 160 of FIG. 1. The time tracking data includes, at least, one or more time entries corresponding to time periods during which a computing resource was used in the development of one or more of the projects. Each time entry specifies a project identifier (e.g. project number) and a date corresponding to the time period.

In operation 606, the server identifies those defined computing tasks that correspond to the time entries in the time tracking data. For example, the server may determine mappings of computing tasks to time entries representing the respective time periods. In at least some embodiments, such mappings may be determined by associating computing tasks to time entries based on information included in the task data. For example, the task data for a defined computing task associated with a project may indicate the dates on which the computing resource was used for working on the defined computing task. By cross-referencing the task data with the time tracking data, the server may identify matches between a plurality of defined computing tasks and their associated projects.

In some cases, a computing resource may be used to work on multiple computing tasks for two or more different projects on a same date. In particular, it may not be possible for the server to determine unique mappings of computing tasks to time entries of the time tracking data, relying on the task data. The server may thus require additional information in order to disambiguate time tracking data for the projects. In operation 608, the server determines whether there is ambiguity in the mapping of computing tasks to time periods. An "ambiguity" refers to an instance of unsuccessful mapping of a computing task to a time period as a result of, at least in part, insufficient information. If one or more ambiguities are detected, the server may identify client computing devices associated with the detected ambiguity instances in operation 610. The client computing device(s) may be identified based on the device identifying information included in the task data for those tasks associated with the ambiguity instances. The server then generates prompts for the identified computing devices, in operation 612, to provide supplementary data which may facilitate determining correct mappings of computing tasks to time periods.

If, on the other hand, no ambiguity instances are detected by the server, the server generates notifications based on the mappings of computing tasks to time periods, in operation 614. That is, if no ambiguity is detected, the task data and the time tracking data obtained by the server were sufficient for associating the defined computing tasks to their respective time periods. For example, the notifications may be notifications of resource usage for the defined computing tasks.

Figure 7:
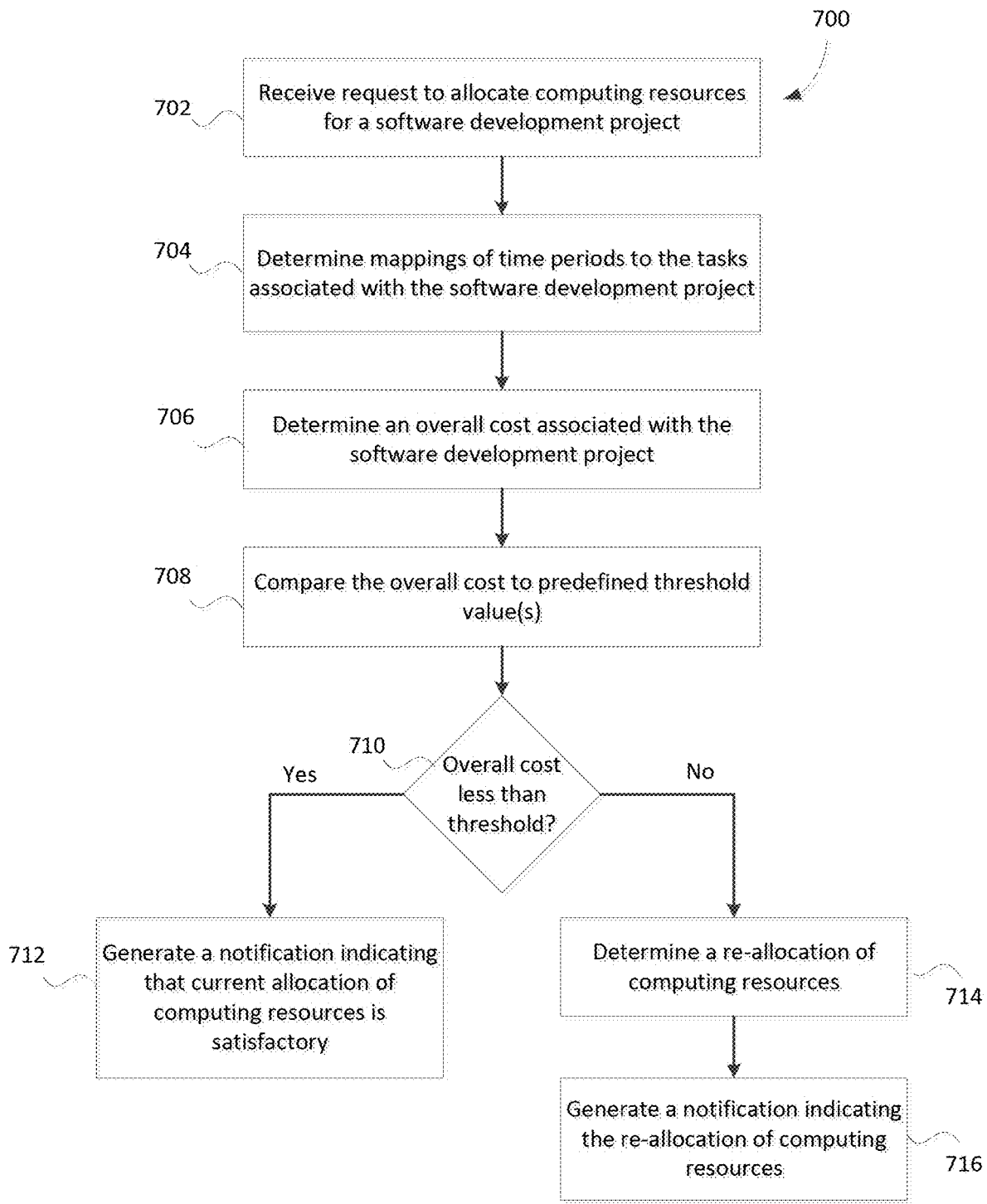
FIG. 7 shows, in flowchart form, an example method for allocating computing resources for a software development project.

Reference is made to FIG. 7, which shows, in flowchart form, an example method 700 for allocating computing resources for a software development project. The operations of method 700 may be performed as part of the functionalities of a software development project management system. The method 700 may be incorporated into a mechanism for managing computing resources that are assigned to one or more software development projects. In particular, the method 700 may be included in a process for controlling access to computing resources associated with the projects.

Operations 702 and onward may be performed by one or more processors of a computing device such as, for example, the processor 200 (FIG. 2) of one or more suitably configured instances of the example computing device 105 (FIG. 2). In at least some embodiments, the method 700 may be performed by a server system. In particular, a server (such as SDPM server 180 of FIG. 1, in some embodiments) may perform all of part of the operations of method 700.

In operation 702, the server receives a request to allocate computing resources for a software development project. Such request may, for example, be received from a computing device associated with a project manager or Scrum master for a specific software development project.

In operation 704, the server determines mappings of defined computing tasks associated with the software development project to one or more time periods. The mappings may be determined in accordance with the techniques described above with reference to methods 500 and 600. More specifically, the mappings may be determined based on task data for the defined computing tasks of the project and resource tracking data identifying the time periods which reflect use of a computing resource in association with the project.

In operation 706, the server determines an overall cost associated with the software development project. The overall cost may represent one or a combination of a current monetary cost and amount of time spent in using various computing resources for working on tasks that are associated with the project. That is, the overall cost of a project represents the cost of using the computing resources, as currently allocated, to the various tasks associated with the project. Such budgetary and time tracking may be done based on the mappings of defined computing tasks to time periods, determined in operation 704.

Once the overall cost of the project is determined, this cost is compared to a predefined threshold value, in operation 708. The threshold value may represent an upper limit on an acceptable cost for the specific project. That is, the threshold value may be set based on what is acceptable in terms of the cost of using the computing resources towards the development for the project. If the server determines that the overall cost is less than the threshold in operation 710, the server generates a notification indicating that the current allocation of computing resources for the project is satisfactory.

If, on the other hand, the overall cost is determined to be equal to or greater than the threshold in operation 710, the server may determine a re-allocation of computing resources to the computing tasks associated with the project, in operation 714. For example, the server may identify those tasks having the highest associated resource costs and determine alternative assignments of computing resources (e.g. client computing devices, developers, project managers, etc.) to the identified tasks. Numerous different assignments of the computing resources may be generated by the server in operation 714.

The server may subsequently generate a notification, for display on a computing device, indicating the re-allocation of computing resources to the tasks of the project, in operation 716. The notification may, for example, indicate that the re-allocation of computing resources may result in lower overall cost for the project compared to the current allocation.

The various embodiments presented above are merely examples and are in no way meant to limit the scope of this application. Variations of the innovations described herein will be apparent to persons of ordinary skill in the art, such variations being within the intended scope of the present application. In particular, features from one or more of the above-described example embodiments may be selected to create alternative example embodiments including a sub-combination of features which may not be explicitly described above. In addition, features from one or more of the above-described example embodiments may be selected and combined to create alternative example embodiments including a combination of features which may not be explicitly described above. Features suitable for such combinations and sub-combinations would be readily apparent to persons skilled in the art upon review of the present application as a whole. The subject matter described herein and in the recited claims intends to cover and embrace all suitable changes in technology.

The invention claimed is:

1. A computing system, comprising:
a processor; and
a memory coupled to the processor, the memory storing computer-executable instructions that, when executed by the processor, configure the processor to:
receive, via a computing device, a request to allocate computing resources comprising shared software assets for a software development project;
obtain, based on querying for projects data of one or more specific projects from an activity logging system, activity data associated with one or more defined computing tasks associated with the software development project, the activity data indicating progress towards completion of the one or more defined computing tasks;
obtain, based on querying for projects data of the one or more projects from a resource usage monitoring system, time-based resource tracking data associated with the software development project, the resource tracking data including project identifying data associated with the software development project and project time data identifying one or more time periods reflecting use of a computing resource in association with the software development project;
determine mappings of the one or more time periods to the one or more defined computing tasks based on the resource tracking data and the activity data associated with the one or more defined computing tasks;
determine, based on the mappings, a total resource cost associated with use of currently allocated computing resources for the one or more defined computing tasks;
in response to determining that the total resource cost exceeds a defined threshold value:
determine a reallocation of computing resources based on identifying a different assignment of the computing resources to the one or more defined computing tasks;
generate a notification, for display on a computing device, indicating the reallocation of computing resources; and
control access to the computing resources comprising shared software assets for the software development project based on comparison of the total resource cost to the defined threshold value.

2. The computing system of claim 1, wherein the notification comprises an indication of a total amount of time associated with completing the one or more defined tasks.

3. The computing system of claim 1, wherein the notification comprises an indication of a total monetary cost associated with completing the one or more defined tasks.

4. The computing system of claim 1, wherein determining that the total resource cost exceeds the defined threshold value comprises determining that a total amount of time associated with resource usage for the one or more defined computing tasks has exceeded a predefined threshold.

5. The computing system of claim 1, wherein the project time data includes date information associated with the at least one project, and wherein the mappings are determined based on determining dates associated with the one or more defined computing tasks from the date information.

6. The computing system of claim 1, wherein the project identifying data comprises a project number.

7. The computing system of claim 1, wherein the time-based resource tracking data comprises a listing of time entries, each of the time entries being associated with a project number and a date.

8. The computing system of claim 1, wherein the instructions, when executed, further configure the processor to:
obtain resource usage information for a plurality of defined tasks that are associated with an entity; and
generate a notification for the entity based on the resource usage information for the plurality of defined tasks associated with the entity.

9. The computing system of claim 8, wherein the notification comprises a predefined message that is selected based on the resource usage information for the entity.

10. A method for allocating computing resources for a software development project, the method comprising:
receiving, via a computing device, a request to allocate computing resources comprising shared software assets for a software development project;
obtaining, based on querying for projects data of one or more specific projects from an activity logging system, activity data associated with one or more defined computing tasks associated with the software development project, the activity data indicating progress towards completion of the one or more defined computing tasks;

obtaining, based on querying for projects data of the one or more projects from a resource usage monitoring system, time-based resource tracking data associated with the software development project, the resource tracking data including project identifying data associated with the software development project and project time data identifying one or more time periods reflecting use of a computing resource in association with the software development project;

determining mappings of the one or more time periods to the one or more defined computing tasks based on the resource tracking data and the activity data associated with the one or more defined computing tasks;

determining, based on the mappings, a total resource cost associated with use of currently allocated computing resources for the one or more defined computing tasks;

in response to determining that the total resource cost exceeds a defined threshold value:
  determining a reallocation of computing resources based on identifying a different assignment of the computing resources to the one or more defined computing tasks;
  generating a notification, for display on a computing device, indicating the reallocation of computing resources; and
  controlling access to the computing resources comprising shared software assets for the software development project based on comparison of the total resource cost to the defined threshold value.

11. The method of claim 10, wherein the notification comprises an indication of a total amount of time associated with completing the one or more defined tasks.

12. The method of claim 10, wherein the notification of resource usage comprises an indication of a total monetary cost associated with completing the one or more defined tasks.

13. The method of claim 10, wherein determining that the total resource cost exceeds the defined threshold value comprises determining that a total amount of time associated with resource usage for the one or more defined computing tasks has exceeded a predefined threshold.

14. The method of claim 10, wherein the project time data includes date information associated with the at least one project, and wherein the mappings are determined based on determining dates associated with the one or more defined computing tasks from the date information.

15. The method of claim 10, wherein the project identifying data comprises a project number.

16. The method of claim 10, wherein the time-based resource tracking data comprises a listing of time entries, each of the time entries being associated with a project number and a date.

17. The method of claim 10, further comprising:
  obtaining resource usage information for a plurality of defined tasks that are associated with an entity; and
  generating a notification for the entity based on the resource usage information for the plurality of defined tasks associated with the entity.

18. The method of claim 17, wherein the notification comprises a predefined message that is selected based on the resource usage information for the entity.

* * * * *